May 27, 1930.  L. L. BISHOP  1,760,108
MOTOR VEHICLE
Filed July 3, 1928   2 Sheets-Sheet 1
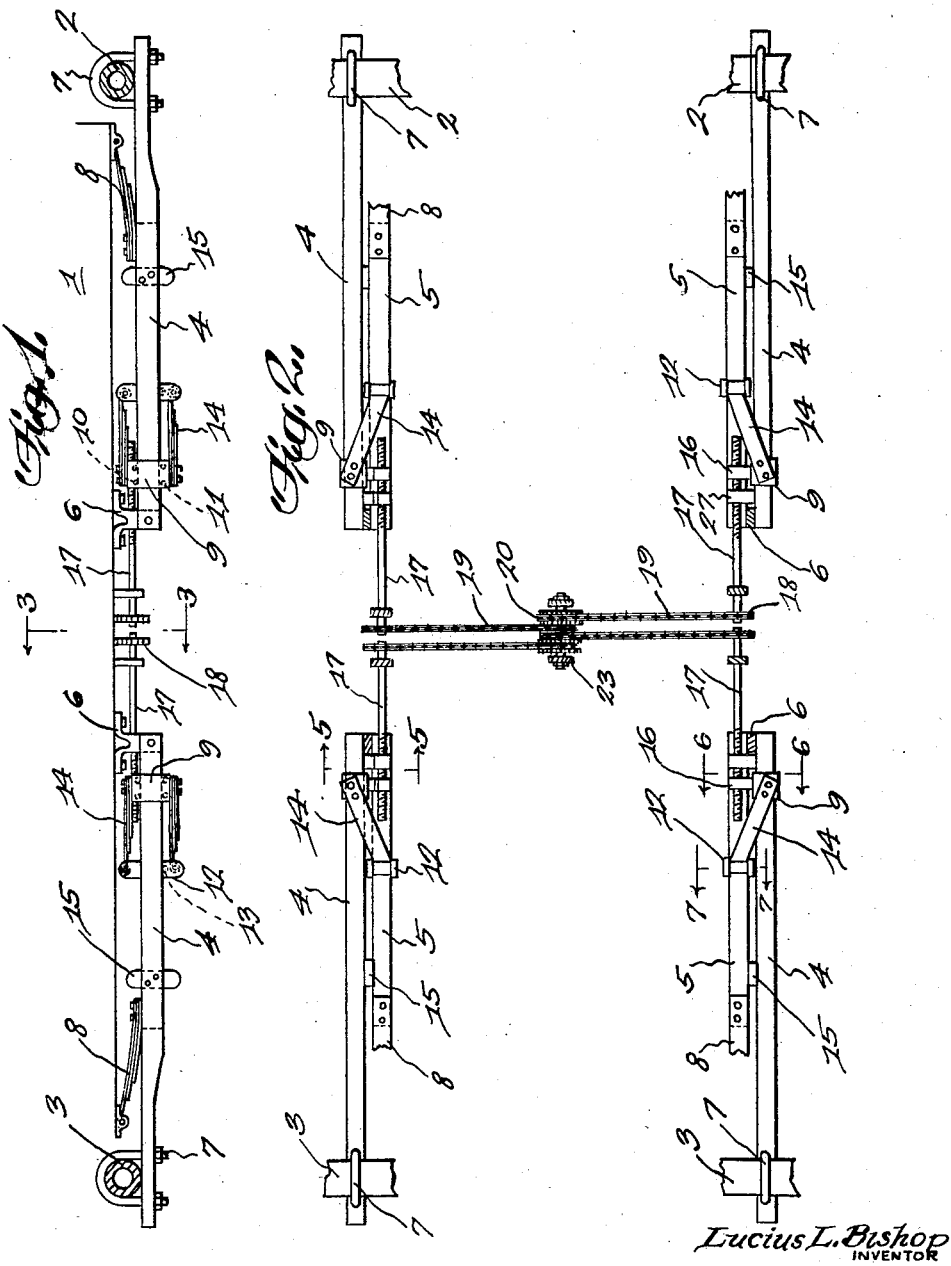
Lucius L. Bishop
INVENTOR
BY Arnold M. Ehrlich
ATTORNEY May 27, 1930.   L. L. BISHOP   1,760,108
MOTOR VEHICLE
Filed July 3, 1928   2 Sheets-Sheet 2
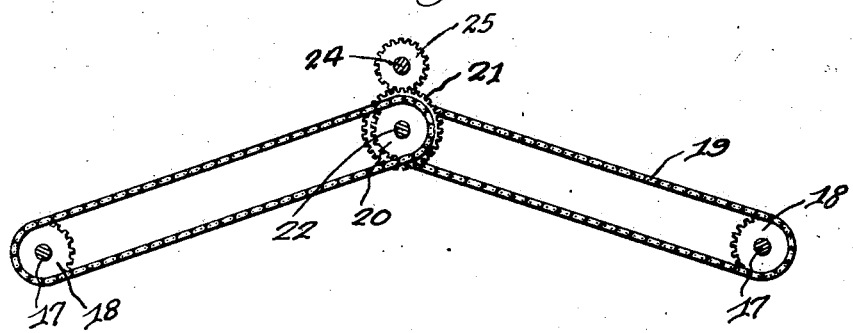
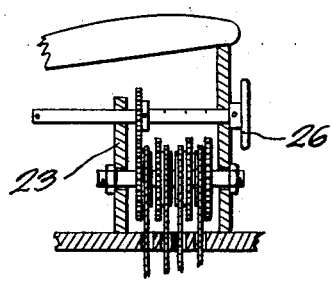
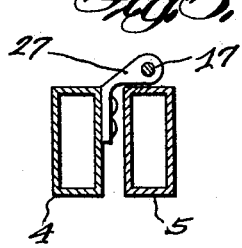
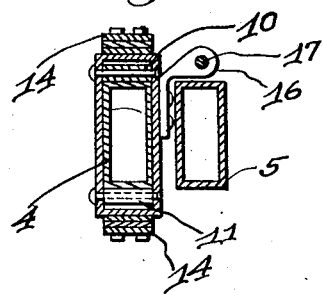
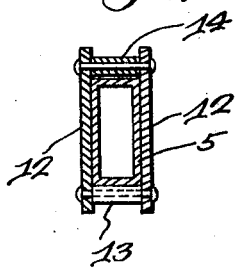
Lucius L. Bishop
INVENTOR
BY Arnold M. Ehrlich
ATTORNEY Patented May 27, 1930

1,760,108

UNITED STATES PATENT OFFICE

LUCIUS L. BISHOP, OF CHICAGO, ILLINOIS

MOTOR VEHICLE

Application filed July 3, 1928. Serial No. 290,083.

This invention relates to new and useful improvements in motor vehicles, particularly to the chassis or support for the body of a motor vehicle. One of the objects of my invention is the provision of a chassis or support for a vehicle body which will reduce to a minimum the shock or jar which is generally conveyed to the body of the vehicle when passing over rough and uneven roads.

Another object of the invention is the provision of a chassis for motor vehicles whereby the supporting leverage of the same can be readily adjusted in accordance with the weight of the load carried and the position in the body of the weight of the load or its position in the body the shock or jar conveyed, thereto will be reduced to a minimum.

Another object of the present invention is the provision of means which is located adjacent the driver's seat whereby the operator of the vehicle may be able to readily adjust the leverage of the chassis in accordance with the weight of the load or its position in the vehicle body.

A further object of the present invention is the provision of a chassis or support for the body of a motor vehicle which is so constructed as to provide for the lowering of the height of the vehicle a few inches below the height of the standard type of vehicle and at the same time leave the same amount of clearance between the axles and the body of the car.

With the above and other objects in view the invention consists in the novel features of construction, the combination and arrangement of parts hereinafter more fully set forth, pointed out in the claims and shown in the accompanying drawings in which:

Figure 1 is a side elevation of my improved chassis.

Figure 2 is a top plan view, parts being broken away and shown in section.

Figure 3 is a detail section on the line 3—3 of Figure 1.

Figure 4 is a vertical section of the control gears beneath the operator's seat.

Figure 5 is a detail section on the line 5—5 of Figure 2.

Figure 6 is a detail section on the line 6—6 of Figure 2.

Figure 7 is a detail section on the line 7—7 of Figure 2.

In the accompanying drawings 1 indicates the body of the vehicle and 2 and 3 the front and rear axles respectively. The main part of the improved chassis consists of outer bars 4 and inner bars 5, each four in number and the inner and outer bars are arranged in parallel pairs with two pairs beneath the front of the body 1, and two pairs beneath the rear of the body. The inner ends of both sets of bars 4 and 5 are pivoted to brackets 6 that are suspended from the bottom of the body adjacent the center thereof. The outer ends of the bars 4 are attached to the front and rear axles by means of the U-shaped clips 7.

The outer ends of the bars 5 are connected to the front and rear portions of the body 1 at the bottom thereof, by means of the springs 8. The outer end of each spring is attached to a bracket on the bottom of the vehicle while the inner end of each spring is connected to the bars 5 by U-bolts or other suitable fastening means.

Mounted for sliding movement on the inner ends of the bar 4 are the sleeves 9 which are preferably rectangular in shape so as to surround the bars 4, each carry therein two sets of rollers 10 and 11, the set 10 being arranged to ride on top of each bar 4 and the set 11 arranged to ride on the bottom thereof. Attached to each bar 5 adjacent its inner end are the brackets 12 each having a bearing roller 13 adapted to bear on the lower edge of each bar 5.

Attached to the upper and lower faces of the sleeves 9 are the springs 14, the springs on the top of the sleeves having their outer ends attached to the ends of the brackets 12 which project above the bars 5, while the springs attached to the lower face of the sleeves 9 have their outer ends attached to the ends of the brackets 12 which extend below the bars 5 as is clearly illustrated in Figure 1. Spacer blocks 15 are placed between the bars 4 and 5.

Attached to the sleeves 9 upon the inner sides thereof are the threaded brackets 16 through which are threaded the outer ends of the screw members 17. These screw members have their inner ends arranged beneath the central portion of the body and are provided with sprockets 18 over which ride the sprocket chains 19.

It will be noted that there are four sprocket chains, two extending inwardly from each side of the body and all pass around sprockets 20 which are in turn connected to four gears 21 rotatably mounted on shaft 22. This shaft 22 is arranged in a housing 23 beneath the driver's seat and arranged in the housing above shaft 22 and parallel therewith is a second shaft 24 mounted for rotating and sliding movement. The shaft 24 carries a pinion 25 which engages with any of the gears 21 for rotating said gears. The outer end of the shaft 24 has a hand wheel 26 thereon adapted to be grasped by the operator for imparting sliding and rotating movement to the shaft 24 and pinion 25.

Attached to the inner face of each bar 4 adjacent its inner end is a supporting bracket 27 formed with an internally threaded bearing sleeve for receiving and supporting the screw members 17 so that they will properly adjust the sleeves 9. The inner ends of the screw members 17 are supported in suitable brackets 28 suspended from the bottom of the body 1.

It will be apparent from the foregoing that the leverage of my improved chassis may be readily adjusted according to the weight of the load or the position of the load in the body and that the shock of a jar is not conveyed to the body, but is taken up through the movement of bars 4 and 5 and the springs 8 and 14. For comparatively heavy weights the sleeves 9 are adjusted toward the outer ends of the bars 4 and as the weight is lighter the sleeves can be adjusted inwardly from the center of the vehicle, the amount of adjustment being varied according to the weight of the load being carried. It will be apparent that with my type of chassis it can be manufactured and applied at a very low cost as the bars 4 and 5 constituting the main portion of the chassis are preferably made hollow in construction as shown.

While I have shown and described the preferred form of my invention it will be apparent that various changes and alterations may be carried out without departing from the spirit of the invention or the scope of the appended claims.

What I claim and desire to secure by Letters Patent is:

1. A chassis for supporting the body of a vehicle including bars arranged in parallel pairs beneath the body at the front and rear at each side thereof, one bar of each pair having one end pivotally connected to the body of the vehicle adjacent the center and the other end connected to an axle of the vehicle, the other bar of each pair having one end pivotally connected to the body of the vehicle near the center, springs connecting the other end of the last bars to the body of the vehicle at each end, and means whereby to adjust the leverage of said bars.

2. A chassis for supporting the body of a vehicle including bars arranged in normally parallel pairs beneath the body at the front and rear at each side thereof, means pivotally connecting the inner ends of said bars to the body adjacent the center thereof, means connecting the outer ends of one bar of each pair to an axle of a vehicle, means yieldably connecting the outer ends of the other bar of each pair to the ends of the body, adjustable and yieldable connection between the bars of each pair, and means for adjusting the latter connection.

3. A vehicle chassis including a plurality of bars arranged in parallel pairs beneath the front and rear of the vehicle body at each side thereof, means forming movable and yieldable connection between one bar of each pair and the body, means connecting the other bar of each pair to the body and the axles thereof, movable brackets carried by the first bar of each pair, a movable sleeve carried by each of the second bars of each pair, spring members above and below said bars and forming connection between the said sleeves and brackets, and means for adjusting the said sleeves and brackets.

In witness whereof I hereunto set my hand.

LUCIUS L. BISHOP.